United States Patent
Hall et al.

(10) Patent No.: US 8,010,657 B2
(45) Date of Patent: Aug. 30, 2011

(54) SYSTEM AND METHOD FOR TRACKING THE NETWORK VIRAL SPREAD OF A DIGITAL MEDIA CONTENT ITEM

(75) Inventors: Richard Hall, San Rafael, CA (US); David Charles Alexander Hodgson, San Francisco, CA (US)

(73) Assignee: Crackle, Inc., Sausalito, CA (US)

(*) Notice: Subject to any disclaimer, the term of this patent is extended or adjusted under 35 U.S.C. 154(b) by 269 days.

(21) Appl. No.: 11/945,833

(22) Filed: Nov. 27, 2007

(65) Prior Publication Data
US 2008/0256233 A1 Oct. 16, 2008

Related U.S. Application Data

(60) Provisional application No. 60/861,342, filed on Nov. 27, 2006.

(51) Int. Cl.
G06F 15/173 (2006.01)
G06F 17/00 (2006.01)
(52) U.S. Cl. .......................... 709/224; 715/215; 715/736
(58) Field of Classification Search .................. 709/224; 715/215, 736; 705/10
See application file for complete search history.

(56) References Cited

U.S. PATENT DOCUMENTS

| | | | | |
|---|---|---|---|---|
| 7,353,270 | B2* | 4/2008 | Kumar et al. | 709/224 |
| 7,496,960 | B1* | 2/2009 | Chen et al. | 726/22 |
| 7,526,545 | B2* | 4/2009 | Jerome | 709/224 |
| 2002/0124246 | A1* | 9/2002 | Kaminsky et al. | 725/9 |
| 2003/0167402 | A1* | 9/2003 | Stolfo et al. | 713/200 |
| 2004/0143667 | A1 | 7/2004 | Jerome | |
| 2004/0220850 | A1 | 11/2004 | Ferrer et al. | |
| 2005/0171838 | A1 | 8/2005 | Eglinton | |
| 2007/0208614 | A1* | 9/2007 | Arnett et al. | 705/10 |
| 2007/0239840 | A1* | 10/2007 | Ishikawa | 709/210 |
| 2008/0059992 | A1* | 3/2008 | Amidon et al. | 725/25 |
| 2008/0071796 | A1* | 3/2008 | Ghuneim et al. | 707/10 |
| 2008/0091517 | A1* | 4/2008 | Koonce et al. | 705/10 |
| 2009/0031023 | A1* | 1/2009 | Golovinski | 709/224 |
| 2009/0106100 | A1* | 4/2009 | Mashinsky | 705/14 |

FOREIGN PATENT DOCUMENTS

| | | |
|---|---|---|
| WO | 0101307 A2 | 1/2001 |
| WO | 0123976 A2 | 4/2001 |
| WO | 0150416 A2 | 7/2001 |

OTHER PUBLICATIONS

Viraltracker, http://www.viraltracker.nl/EN/index.htm, downloaded Aug. 14, 2007, 1 pages.

* cited by examiner

*Primary Examiner* — Philip J Chea
(74) *Attorney, Agent, or Firm* — Mark D. Wieczorek; Mayer & Williams PC

(57) ABSTRACT

Systems and methods are provided to track viral marketing. The resulting user interfaces can include a map that tracks propagation via a node tree or a geographic map that shows where media was viewed. The information may also be displayed as a cumulative or absolute tracking graph, which is based on various parameters, such as number of views, number of transmissions, rewards earned, etc. The systems and methods can track viral propagation through, e.g., email, social networking service or site messages or postings, and instant messages. Data used by the invention include URLs as received from a media transmission page form, the URLs pertaining to both the propagator and the recipient, time stamps at which the media was propagated and viewed, and so on.

22 Claims, 16 Drawing Sheets

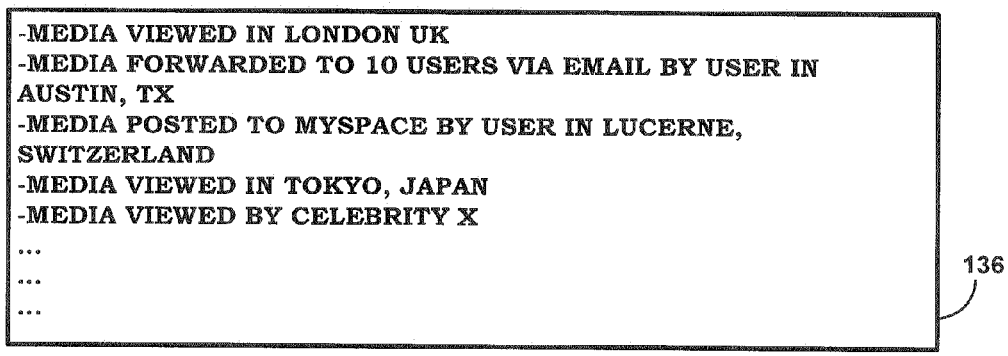
FIG. 16
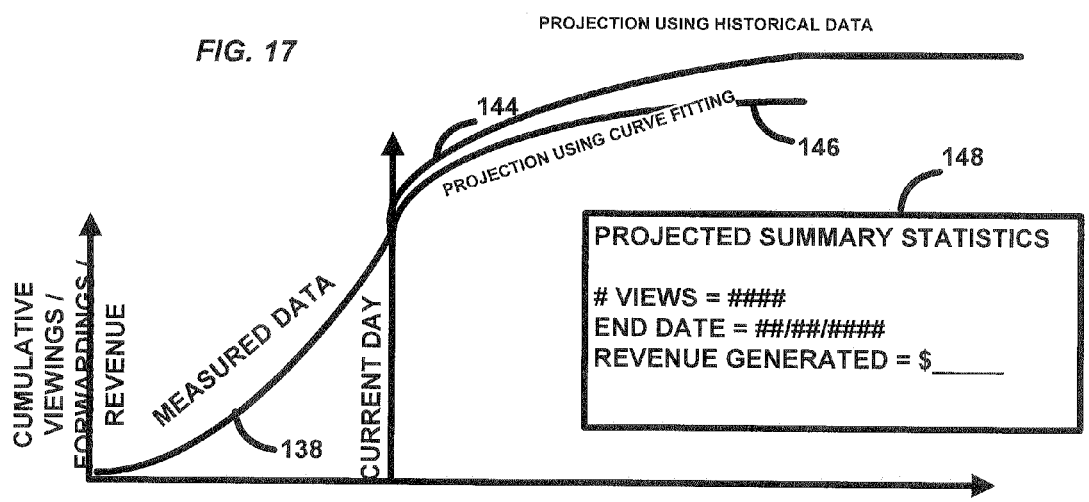
FIG. 17
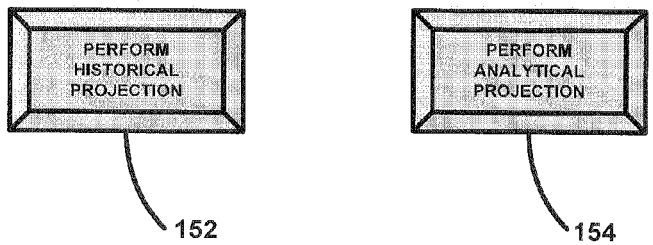

LEAGUE TABLE

|  | JP | USA | CA | TOTAL |
|---|---|---|---|---|
| VID 1 | 967 | 789 | 453 | 2209 |
| VID 2 | 824 | 563 | 341 | 1728 |
| VID 3 | 765 | 627 | 285 | 1677 |
| VID 4 | 678 | 650 | 344 | 1672 |

Viral Database Search

Search Result Matches
Matches for music videos with title containing "Britney"

| Title | Launched | Type | #Transmissions | #Views | Virality Rating | |
|---|---|---|---|---|---|---|
| Baby One More Time | 2 years ago | Music video | 321321 | 2314243 | High | View |
| Oops I did it again | 6 months ago | Music video | 2134215 | 2314325476 | Med | View |
| Britney | 8 months ago | Music video | 213214 | 876876 | Low | View |
| In the Zzone | 11 months ago | Music video | 1423321 | 7687687 | Med | View |
| B in the Mix | 5 days ago | Music video | 12321 | 76867876 | High | View |
| Blackout | 2 years ago | Music video | 2132131 | 678687 | Low | View |

Cancel    OK

SYSTEM AND METHOD FOR TRACKING THE NETWORK VIRAL SPREAD OF A DIGITAL MEDIA CONTENT ITEM

STATEMENT OF RELATED APPLICATION

This application claims the benefit of U.S. Provisional Patent Application Ser. No. 60/861,342, filed Nov. 27, 2006, entitled "Viral Internet Maps", which is incorporated by reference herein in its entirety.

BACKGROUND

Viral marketing, i.e., the planned "word-of-mouth" propagation of marketing campaigns where consumers forward media items about a product or service via electronic communication methods, has proven effectiveness, but quantifying this effectiveness has not been optimized.

SUMMARY

Systems and methods of the invention provide a means to track viral marketing over electronic communication mediums. The resulting user interface can present this tracking data in many forms. First is a map that tracks propagation via a tree. Another is a geographic map that shows where the media was viewed. Yet other forms of information display include cumulative or absolute tracking graphs, based on various parameters, such as number of views, number of transmissions, rewards earned, etc.

Embodiments of the invention can track viral propagation through, e.g., email, social networking service or site messages or postings or instant messages, and mobile phone data communication. Data used by the invention include URLs as received from a media transmission page form, the URLs pertaining to both the propagator and the recipient, time stamps at which the media was propagated and viewed, and so on. Embodiments of the invention also provide electronic forms presented adjacent to media that facilitate forwarding while capturing sender and recipient information.

As the tracking is performed down to the level of a unique individual propagator, an identification may be made of a key influencer in the total propagation. The identification may be made by way of "geo-IP mapping" via a geo-IP server, which captures the location of a user by mapping their IP address to their geographic location. This identification may then be employed to "seed" such key influencers when analogous content items are propagated.

Users of the invention may include both owners and propagators of media, i.e., both the source of the media as well as those who forward the media. In one implementation, the system may be licensed via a tracking API that other sites can use to embed trackable links. In another implementation, a third party propagator can access tracking data to understand transmission patterns and optimize their own viral marketing.

In one aspect, the invention is directed towards a method of tracking and displaying viral propagation of a content item over a network, including obtaining a set of information about a first recipient and at least one second recipient of a content item, wherein the first recipient has forwarded information about the content item to at least the second recipient, and wherein the set of information includes information about whether the second recipient has played the content item. The set of information is then stored, and a first node is displayed indicating the first recipient and a second node is displayed indicating the second recipient. Information regarding users may be anonymized to protect the user's privacy, e.g., only the user's city, state, and/or country and method of transfer such as email, Facebook, SMS, etc. may be displayed.

Implementations of the invention may include one or more of the following. The network may be a LAN, WLAN, an open or closed network, the Internet, and other such communications media. The displaying step may include displaying a node tree, displaying information about the first recipient and information about the second recipient in a list, or displaying a geographic map with nodes disposed thereon, the nodes indicating the geographic location of the first and second recipients. The obtaining step may include receiving information from a form such as on a mobile phone, a web form, or from a media content website. The forwarded information about the content item may be a link to a media content website. The method may further comprise identifying and storing information about one or more key influencers, and/or determining which recipients, in combination with their subsequent child recipients, have forwarded the content item on to a highest number of other recipients. The displaying step may not only include displaying a node tree but also displaying a geographic map with nodes, the nodes indicating the geographic location of the first and second recipients, and the displaying a node tree and the displaying a map may be performed sequentially as part of a webpage, computer or device application or screensaver. The displaying may further include displaying an accelerated progression of growth of the node tree or the map in a time-lapse manner. The displaying may further include displaying a current date or time marker and displaying a projected node tree for times subsequent to the current date or time marker, the projection based on a mathematical projection or based on a viral propagation of an analogous content item. The content item and the analogous content item may share a characteristic in common, the characteristic being a variable stored as metadata. The method may display orphan nodes, i.e., those lacking sufficient information about their forwarding to display a parent node. In some cases, the system may only display orphan nodes. The method may further include obtaining a set of information about a recipient of a content item, where the set of information includes information about whether a recipient has played the content item; storing the set of information; and displaying a node indicating the recipient. The method may apply to situations where the user has forwarded the media item to multiple recipients at a time.

In another aspect, the invention is directed to a method of tracking and displaying viral propagation of a content item over a network, including obtaining a set of information about a recipient of a content item, where the set of information includes information about whether a recipient has played the content item; storing the set of information; and displaying a node indicating the recipient.

In a further aspect, the invention is directed towards a method of tracking and displaying viral propagation of a content item over a network, including obtaining information about at least one forwarder of a content item, at least one recipient of the content item, the number of times the content item has been forwarded, and the number of times the content item has been played. The obtained information is then stored, and a graph is displayed with time as the x-axis and a parameter, directly proportional to either the number of times the content item has been forwarded or the number of times the content item has been played, on the y-axis.

Implementations of the invention may include one or more of the following. The parameter may be selected from the group consisting of: the number of times the content item has been forwarded, the number of times the content item has been played, and a revenue generated by a forwarder forwarding a content item. The step of displaying may include displaying a current date or time marker and displaying a projected graph for times subsequent to the current date or time marker, the projection based on a mathematical projection or based on parameters of a prior viral propagation of an analogous content item. In the latter case, the content item and the analogous content item may share a characteristic in common, the characteristic being a variable stored as metadata. The parameter may be displayed on a per-time-period basis or on a cumulative basis.

In yet another aspect, the invention is directed towards a user interface for tracking and displaying viral propagation of a content item over a network, including a node component that has a node tree button which when selected displays a node tree including a first node indicating a first recipient and a second node indicating a second recipient, wherein the first recipient has forwarded information about a content item to the second recipient. The node component also has a map button which when selected displays a map including a first node indicating a geographic location of a first recipient and a second node indicating a geographic location of a second recipient, wherein the first recipient has forwarded information about the content item to the second recipient. The system also has a graph button which when selected displays a graph with time as the x-axis and a parameter, directly proportional to either the number of times the content item has been forwarded or the number of times the content item has been played, on the y-axis.

Advantages of the invention may include one or more of the following. Users are incentivized to submit and forward media items because they can view tracking data about it and they may find the tracking interesting and useful. Viral marketing campaigns may be accelerated and optimized, as users who are key propagators ("influencers") may be identified and targeted. Celebrity content viewers and forwarders can be (if consent is given) particularly noted on the generated interfaces. The effectiveness of viral marketing campaigns may be quantified.

Other advantages and features of the invention will be apparent from the below description, including the figures and claims.

BRIEF DESCRIPTION OF THE DRAWINGS

FIG. 16 is an exemplary user interface showing a ticker display.

FIG. 17 is an exemplary graph which may be shown in a user interface, the graph indicating projected parameter values, the projections based on historical values for analogous content items or on mathematical algorithms.

FIG. 19 shows an exemplary league table.

FIG. 21 shows exemplary results from running the search of FIG. 20.

DETAILED DESCRIPTION

Figure 1:
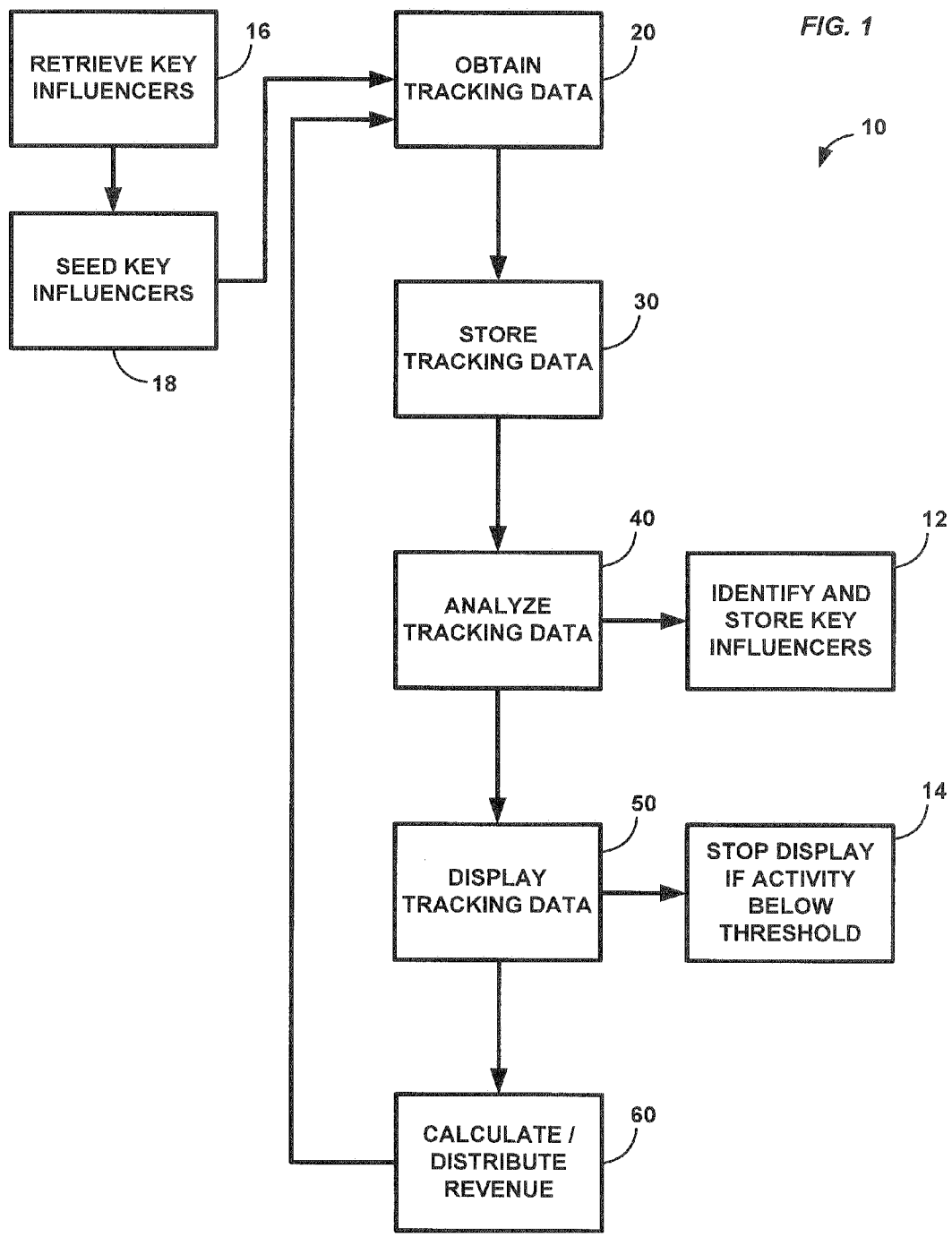
FIG. 1 is a flowchart showing an exemplary method according to an embodiment of the invention.

The following definitions are employed in this description.

"Items of content" or "content items" refer to digital data files or other such media files that one user may forward to another, or about which one user may forward information about to another. Examples include media files such as audio files or video files, such as video clips, songs, television shows, or movies. Other examples include videogames and other digital media, such as screensavers, ringtones, and widgets. Items of content typically have metadata associated with them, such as, for music items, artist, album, release date, genre. Content items may in some cases refer to non-media items, such as data files or application software.

A "media content site" is a website through which users can share digital media items. Such a site is often combined with a level of social networking. Examples of such sites in this definition including Crackle™, YouTube®, MySpace®, Facebook®, Ning and the like. Such sites may include not only single domain networks but also those that span multiple domains with common backend functions.

To "forward" a content item means to employ a software mechanism to inform one or more users about a content item. Content items may be forwarded to multiple users either sequentially or at the same time. The software mechanism generally allows the user who receives the information about the content item to play back the content item and to forward it themselves. In this description, those who forward are sometimes termed "forwarders", and those who receive are termed "recipients". In a chain of recipients, the "forwarder" may also be the "first recipient" and the "recipient" may be termed the "second recipient".

A "key influencer" is a user who has been identified as having a significant effect on the propagation of a content item. In a simple case, a key influencer may simply be one who forwards many content items, or one who forwards content items to many people. However, a key influencer may also be one who forwards content items to people who in turn are prolific forwarders. In these more complicated scenarios, analyses may be performed in several ways to determine who are key influencers, and the same may involve game theory, integrations over propagating nodes, and the like. In one embodiment, the number of forwards of a user added to the number of forwards the recipients perform may be used as a measure of a key influencer. In this system, the original forwarder may be termed the "parent forwarder" and the original recipients (now forwarders) may be termed the "child forwarders". Extensions of this analysis include the determination of grandchildren forwarders, great-grandchildren forwarders, and so on.

A "link" in this description is any software device used to allow a recipient to obtain access to or to play back a content item as forwarded by a forwarder, where information about the forwarding is transmitted to a tracking site, widget, downloadable application, or other such tracking mechanism. In many cases, a link may be sent via email or instant message to a recipient user who then accesses a media content site to view the subject content item.

To "play" or "play back" a content item refers to the act of displaying or presenting a content item. For example, playing back a content item that is a video clip means to display and show the video clip in an appropriate video clip player. Playing back a content item that is an audio clip means to render it so it may be listened to or otherwise enjoyed. The media player may be any content playback device that is capable of playing back the selected type of content.

A "node" is an indication of a recipient having received and played back at least a portion of a forwarded item. Lines between nodes indicate that a subject content item has been forwarded from the forwarder to the recipient. In some cases, a recipient may forward a content item without playing it back. To track this, in an alternative embodiment, a node may indicate that a recipient has received a content item, without regard to whether it has been played back. In this case, a node color or formatting scheme may be employed to indicate that a playback by the recipient has occurred. Most of the description below employs the first definition.

A "node tree" is a collection of nodes, and lines between nodes, as displayed in a interface. In a geographic map interface, while lines can also be shown, the same are often omitted for clarity: as a network such as the Internet allows nearly-instantaneous transmission of a content item around the world, lines on geographic map interfaces generally are rendered less meaningful.

A "form" or "web form" is a form employed on a mobile phone or media content site with which a user may indicate that they wish to have forwarded a content item to one or more recipients. The same may often be used in conjunction with a Flash or other such executable media player to play the content item. In this context, the term may used for even non-web forms, such as executable mobile applications that may be specific to handset devices, such as may be implemented in Java® or BREW® forms.

A "progression of growth in a time-lapse manner" and the like means to display a video of nodes as they are added, but in such a way that the time axis is compressed. In this way, a user may view nodes being added, but instead of an actual time scale, the time scale is compressed so that the viewing only requires a short viewing time. Put another way, the display is accelerated with respect to time.

A "per time period basis" and the like refers to a count of a number of items related to propagation, e.g., views, forwardings, revenue, etc., where the count is the number that occurred during the given time basis. In contrast, a "cumulative basis" and the like refer to the count of a number of items since the item began propagating.

Other definitions are given below, in the context of the description.

Referring to FIG. 1, a method 10 for tracking and optimizing the viral spread of a content item is shown. "Viral spread", "viral marketing", or "viral propagation" of a content item refers to spread of a content item over a network such as the Internet via a user informing another about the content item. For example, during or after playback of a content item, a form may be provided whereby a user may direct that one or more others receive notification about the content item, e.g., via email, a social networking site posting, or a message on a mobile handset.

Generally, a media originator posts media to a site and opts for tracking (which may be implemented automatically in some embodiments). A first step includes obtaining tracking data (step 20), typically by obtaining, tracking, and storing unique URLs. Each URL may store certain data at a point of transmission, such as user ID, propagation method, propagation submethod, viewing date and time, a celebrity flag and name.

As will be explained in greater detail below, historical information may also be used, and once this historical information has been gained by application of the system and method, the same may be used to help optimize future efforts for analogous or otherwise related content items or marketing efforts.

It should be noted that the seed data need not be necessarily historical. Anecdotal information may also be employed to steer the content item to key influencers.

A next step is to store the obtained tracking data (step 30), such as in a database or other such storage device. The stored data may include certain statistics as required by the embodiment, such as posting date, number of views, number of forwardings, revenue, percentage of times a recipient forwards the content item, average number of recipients when a user retransmits a content item, etc.

The tracking data may optionally be analyzed (step 40). The analysis may include the identification (step 12) of key influencers and storage of relevant data pertaining thereto, such as identification information as well as information about the influenced content item, which in many cases may be obtained via analysis of metadata about the content item.

A next step is to display the tracking data (step 50), and this step may include the display of various charts, trees, maps, graphs, and the like about the tracked data, which are explained in greater detail below. Another optional step may be to cease the display of activity relating to the content item if the number of viewings, forwardings, or the number of an analogous measure falls below a certain threshold (step 14), which would signify that the content item is generally inactive.

A final step in some embodiments is to calculate and distribute revenues (step 60) gained by the system and method to the appropriate parties involved, such as the content generator and the various content forwarders or propagators. This step may also occur at an intermediate time, depending on the application.

Also shown in FIG. 1 are certain "seeding" steps. In particular, if one or more pertinent key influencers for a particular type of content item have been previously identified, the same may have their identification information retrieved by the system (step 16) and may be particularly targeted (step 18). In this way, the same receive notification about the content item and may have a strong effect on the propagation of the same. The form of the notification may vary, but may in many cases may take the form of an email or instant message indicating a recognition of the status of the recipient as a key influencer in a given field, and asking the same to view and forward the content as they deem appropriate.

Figure 2:
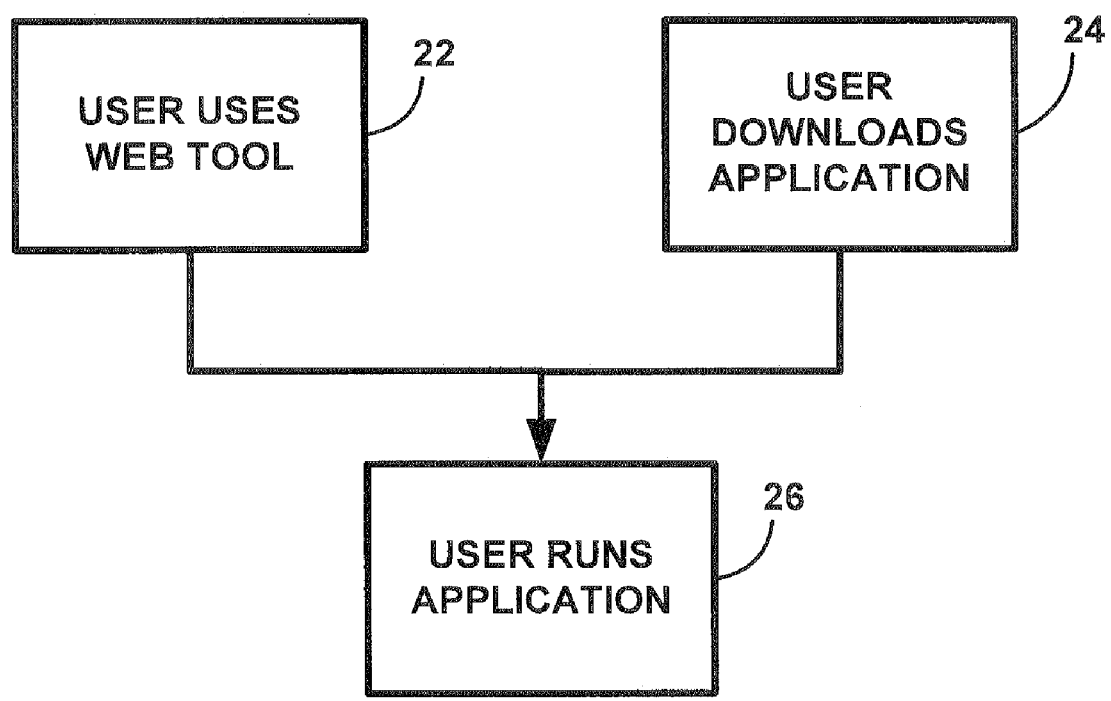
FIG. 2 is a flowchart detailing a particular step within an exemplary method.

FIG. 2 shows a flowchart indicating the way in which a user may obtain use of a tracking application. In one way, a user may use a web-based application tool (step 22) implemented in, e.g., Ajax, Java, ActiveX, Flash, or the like. In this case, the user runs the application (step 26) on the corresponding server, such as on a media content site or social networking system. This type of system often includes use of a "cookie" to allow the user to be recognized the next time the user logs onto the system. In another way, a user may download an application onto their local system (step 24). The downloaded application then is run (step 26) and receives information via one or more tracking methods and analyzes and displays the same as noted below. The downloaded application may receive information via instant messaging, email, synchronization with another system, and so on. In yet another way, the application may be streamed to a client system, which in turns renders the application for use by the user.

In general, any content item may be tracked so long as the forwarding capability is designed into the link, widget, or other forwarded message. Even if the same is only a URL, that can be tracked so long as the URL can uniquely identify the user system.

Figure 3:
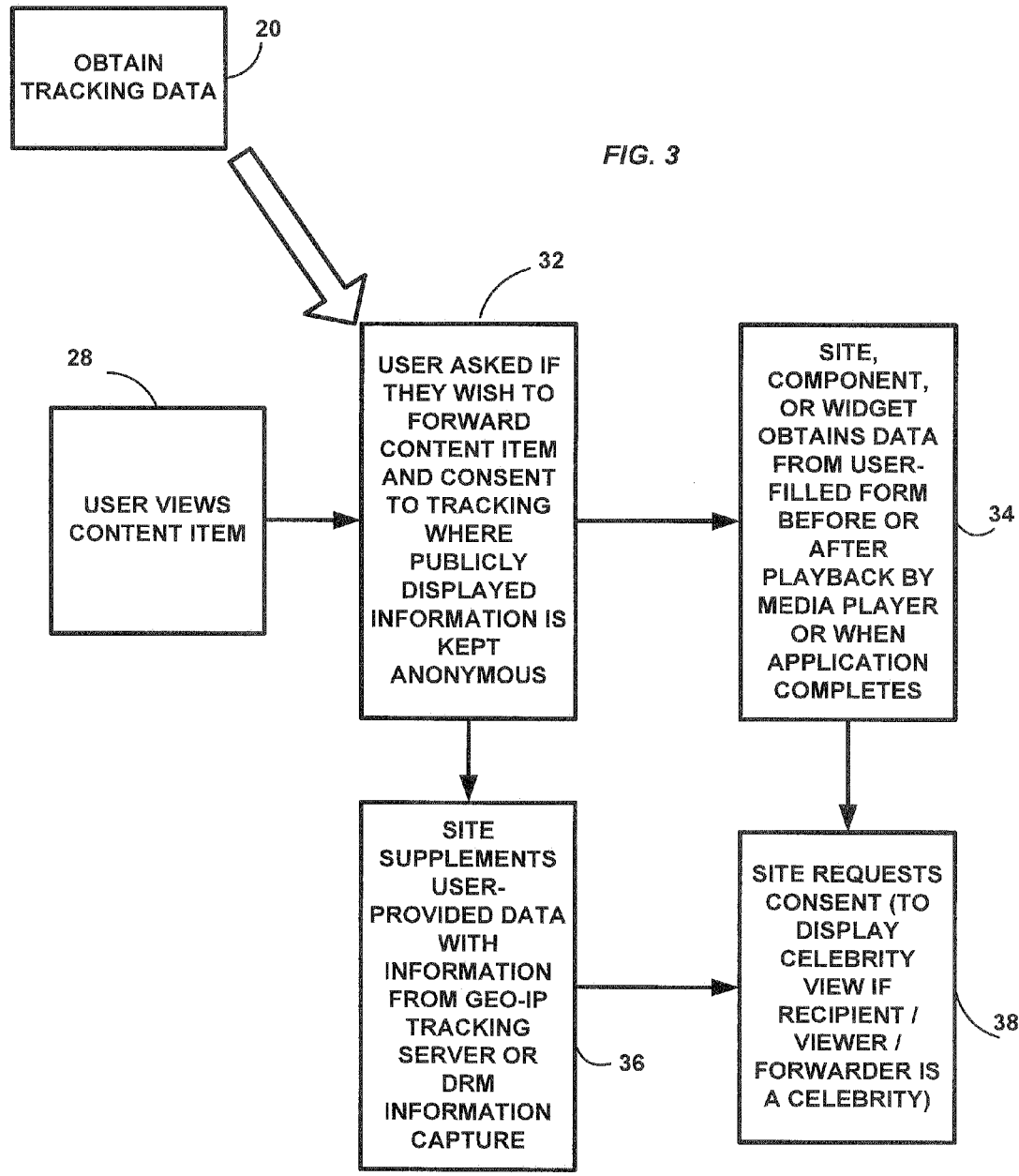
FIG. 3 is a flowchart detailing a particular step within the exemplary method of FIG. 1.

FIG. 3 shows additional details about the step of obtaining tracking data (step 20). In particular, a user may play a content item (step 28). The user may have created the content item, but generally the user was forwarded the content item by a prior user, player, or consumer of the content item. Before, during, or following the playback, the user may be offered the opportunity to forward the content item (step 32). As shown in FIG. 3, the user may be offered in some embodiments to consent to the tracking. Numerous variants are possible, for example, tracking may be accomplished where publicly displayed information is kept anonymous.

Figure 4:
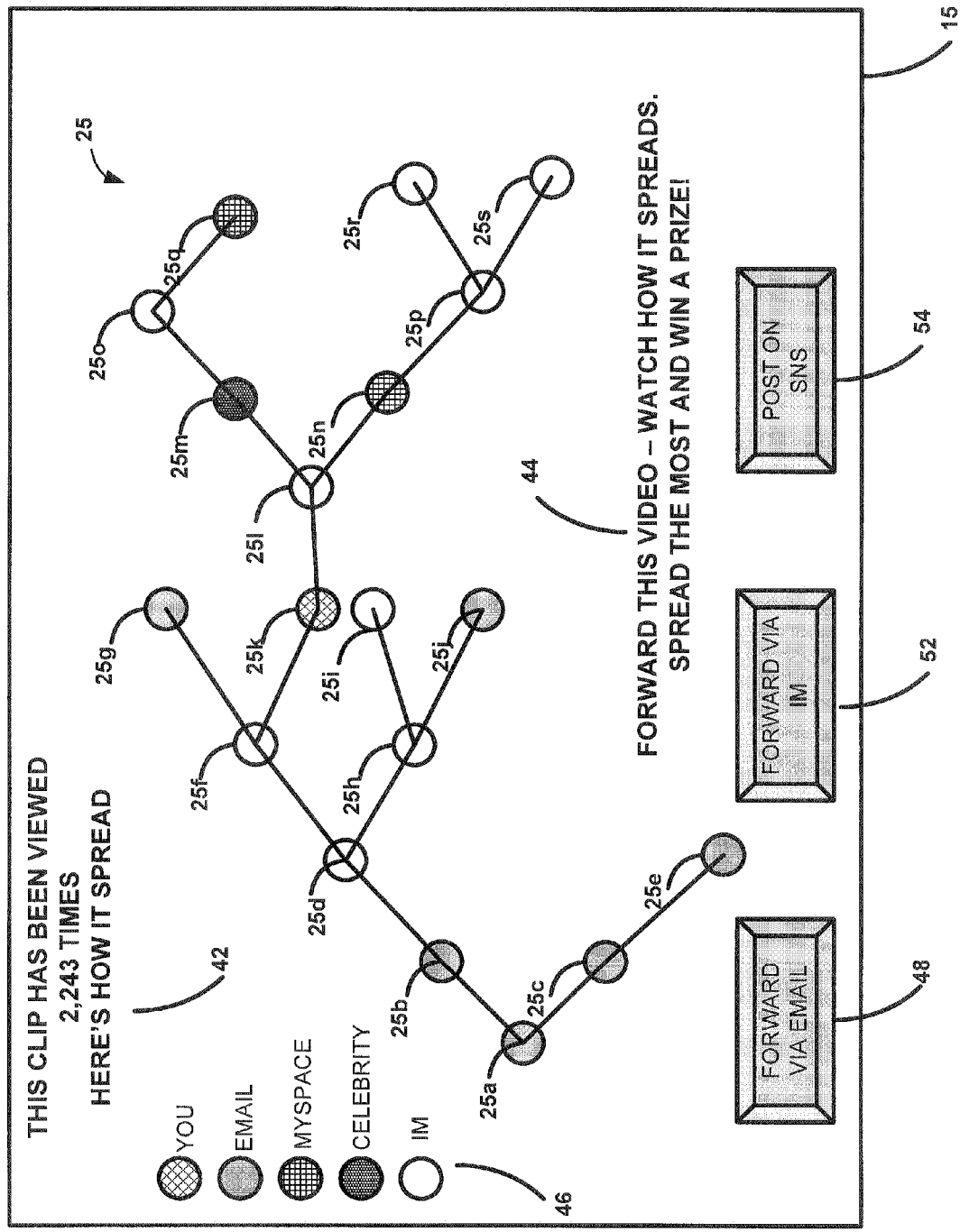
FIG. 4 is an exemplary user interface such as on a web-based media content site, through which a user may forward a content item.

For example, the user may be presented with a user interface 15 such as that shown in FIG. 4. FIG. 4 shows a node tree 25 having nodes 25a-25s disposed thereon. In one embodiment, the format of the nodes may indicate in what way the user denoted by the node received information about the content item. In another embodiment, the format of the nodes may indicate in what way the user denoted by the node transmitted information about the content item. A legend 46 may be provided to indicate which reception or transmission methods correspond to which node formats.

The node tree presented to the user may be an actual node tree pertaining to a portion of the propagation of the content item or may be an exemplary node tree employed to indicate to the user the kind of information they may be entitled to receive if they forward the content item. As such, the same may be animated or enhanced in numerous ways. The interface 15 may display a title 42 indicating the number of times a content item has been viewed, as well as a title 44 enticing the user to forward the same to another user, e.g., by an offer of a prize or the like.

To assist the user in forwarding the content item, buttons 48, 52, and 54 are provided. By selecting button 48, the user is directed to a page allowing them to forward the content item via email. By selecting button 52, the user is directed to a page allowing them to forward the content item via an instant message. By selecting button 54, the user is directed to a page allowing them to forward the content item via a posting on a social networking site, such as MySpace®, Facebook®, or the like.

Referring back to FIG. 3, if the user appropriately fills out a form or otherwise meets the requirements of the prior step (step 32), the tracking site or tracking application may obtain pertinent data from the form (step 34). The data may be obtained before or after playback by the media player or after the application completes, as dictated by the form of the content item. FIG. 3 also shows that the user-provided data may be supplemented with information from a geo-IP mapping server to obtain additional geographic information. The user-provided data may further be supplemented with data obtained during a DRM/license acquisition process (step 36).

Figure 5:
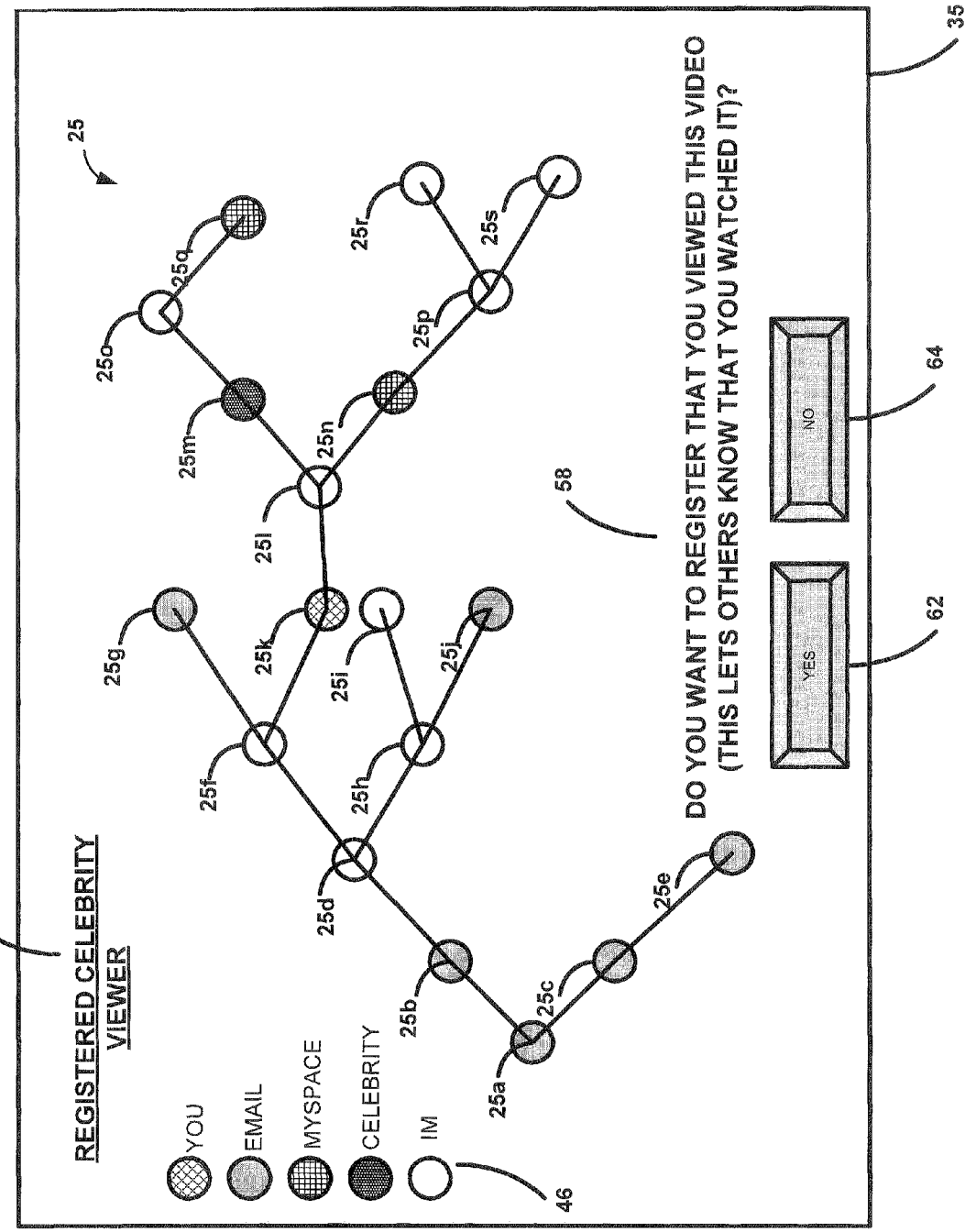
FIG. 5 is an exemplary user interface such as on a web-based media content site, in which a verified celebrity is asked if they consent to being named as a viewer or forwarder of a given content item.

In some cases, the viewer may enjoy celebrity status by some measure and they may be registered as such by the tracking site or application. In this case, the site or application may request consent by the celebrity to use their name or likeness as part of the tracking data (step 38). FIG. 5 shows an exemplary interface 35 to achieve this goal. The interface 35 includes a title 56 giving a cognitive link to the celebrity that they are being treated as such by the system. An interrogative field 58 may be presented asking if they consent to the use of their name or likeness in connection with presentations of the tracking data to a general viewership, e.g., to those who have forwarded the content item, to the originator, to those authorized by the originator, etc. Buttons 62 and 64 may be provided for the celebrity viewer to indicate their response.

Figure 6:
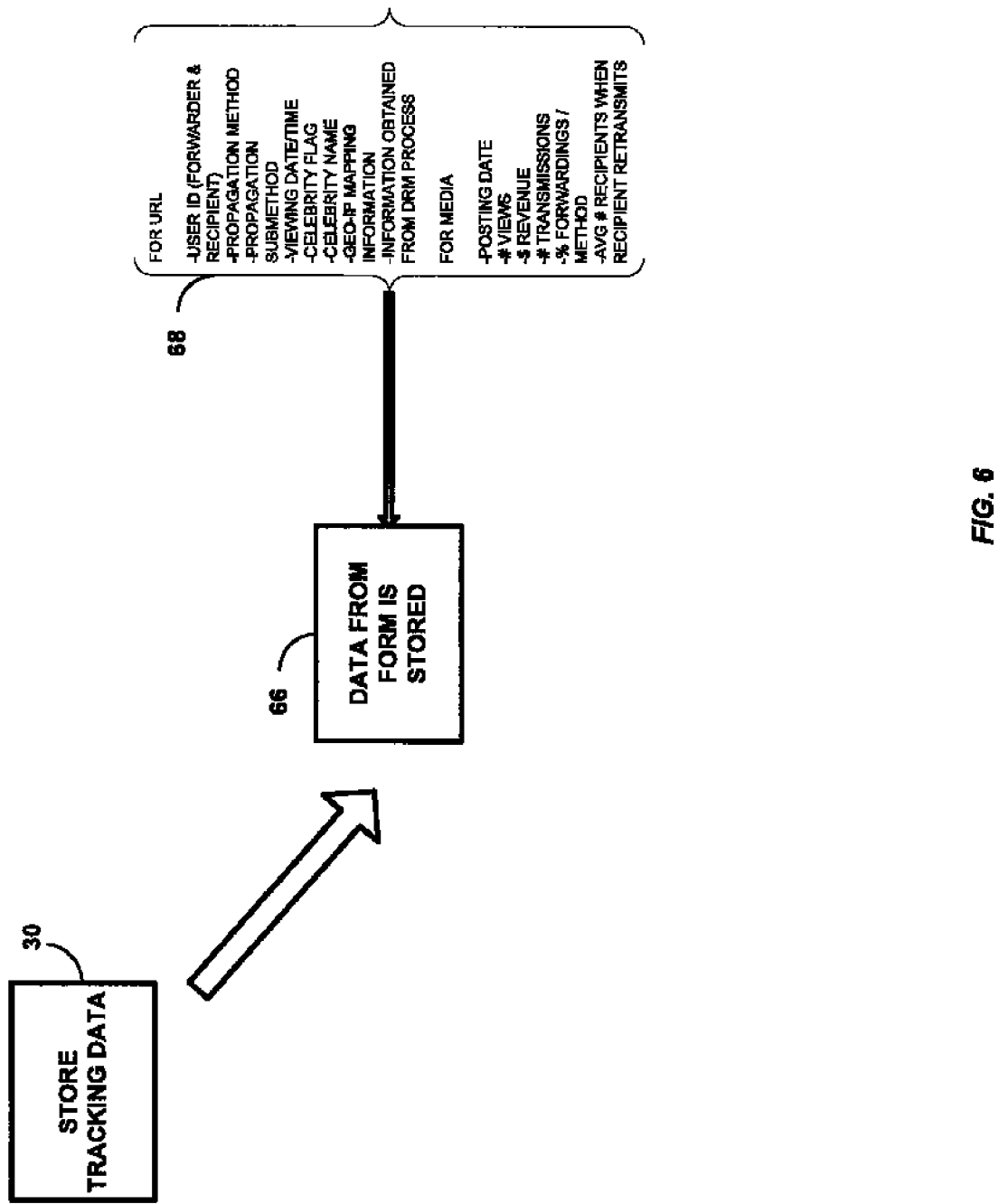
FIG. 6 is a flowchart detailing a particular step within the exemplary method of FIG. 1.

FIG. 6 shows additional details about the step of storing tracking data (step 30). In particular, data from the form may be extracted and stored in a database, spreadsheet, or other appropriate data construct (step 66). The data stored may include information about the forwarder and the recipient, as well as information about the relationship between the two, such as the propagation method used to forward information about the content item. Generally, information may include that shown in field 68 in FIG. 6, although the specific information and data stored may depend on that which is available and that which is needed to display desired information.

Figure 7:
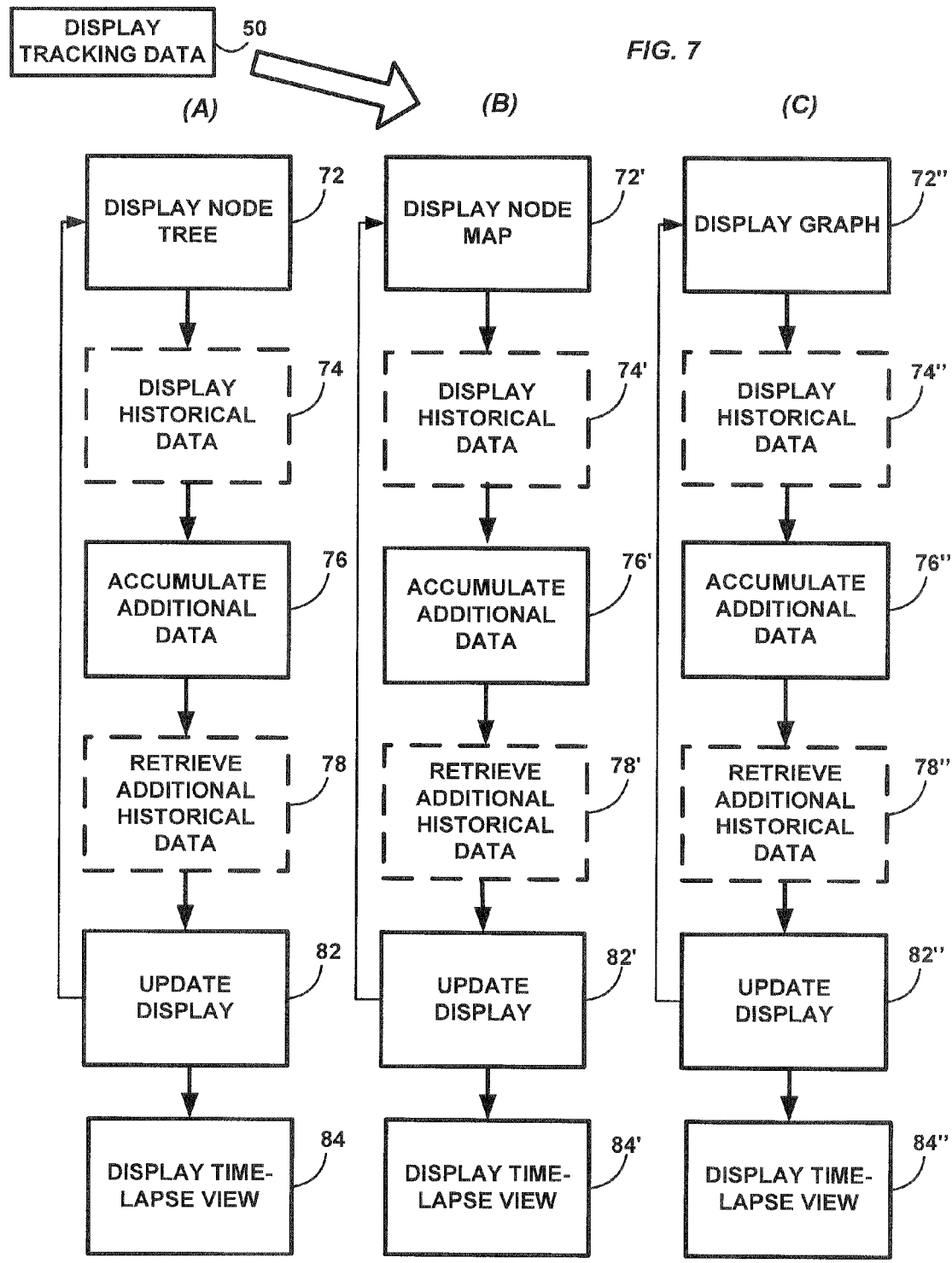
FIG. 7(A)-(C) are flowcharts detailing different ways of performing a particular step within the exemplary method of FIG. 1.

FIG. 7(A)-(C) are flowcharts showing additional details regarding the step of displaying tracking data (step 50). The methods are similar, and are described in detail for the unprimed components of chart (A). The descriptions for the primed components of charts (B)-(C) are the same. In particular, chart (A) describes display and updating of a node tree, chart (B) describes display and updating of a node map (using primed reference numerals), and chart (C) describes display and updating of a graph (using double-primed reference numerals). Examples of these displays are given below.

First, a node tree is populated and displayed with the data that is available. This may include zero, one, or a plurality of nodes (step 72). Optionally, historical data may be displayed in the same window (step 74), and the same may be useful in estimating the propagation of the current content item. The historical data may generally be displayed in the same form, e.g., in a node tree format if the current display is a node tree. Historical data may generally be most useful for similar, analogous, corresponding, or otherwise related content items, such as those having significantly similar metadata, e.g., ID3 tags, as well as similar channels of distribution.

A next step is to accumulate additional data (step 76). For example, a user may have forwarded the content item or a recipient may have viewed a previously-forwarded content item, as well as combinations of these. If such accumulated additional data changes the determination of which historical data is pertinent, then additional historical data may also be obtained (step 78). The display window may then be updated with the additional data (step 82). If the user desires, the progression of the display, i.e., the addition of nodes and links or lines between nodes (indicating forwardings) may be displayed in a time-lapsed or compressed view, so that in just a short period of time a user may view all the nodes being added (step 84), rather than having to watch the progression only in real time.

Figure 8:
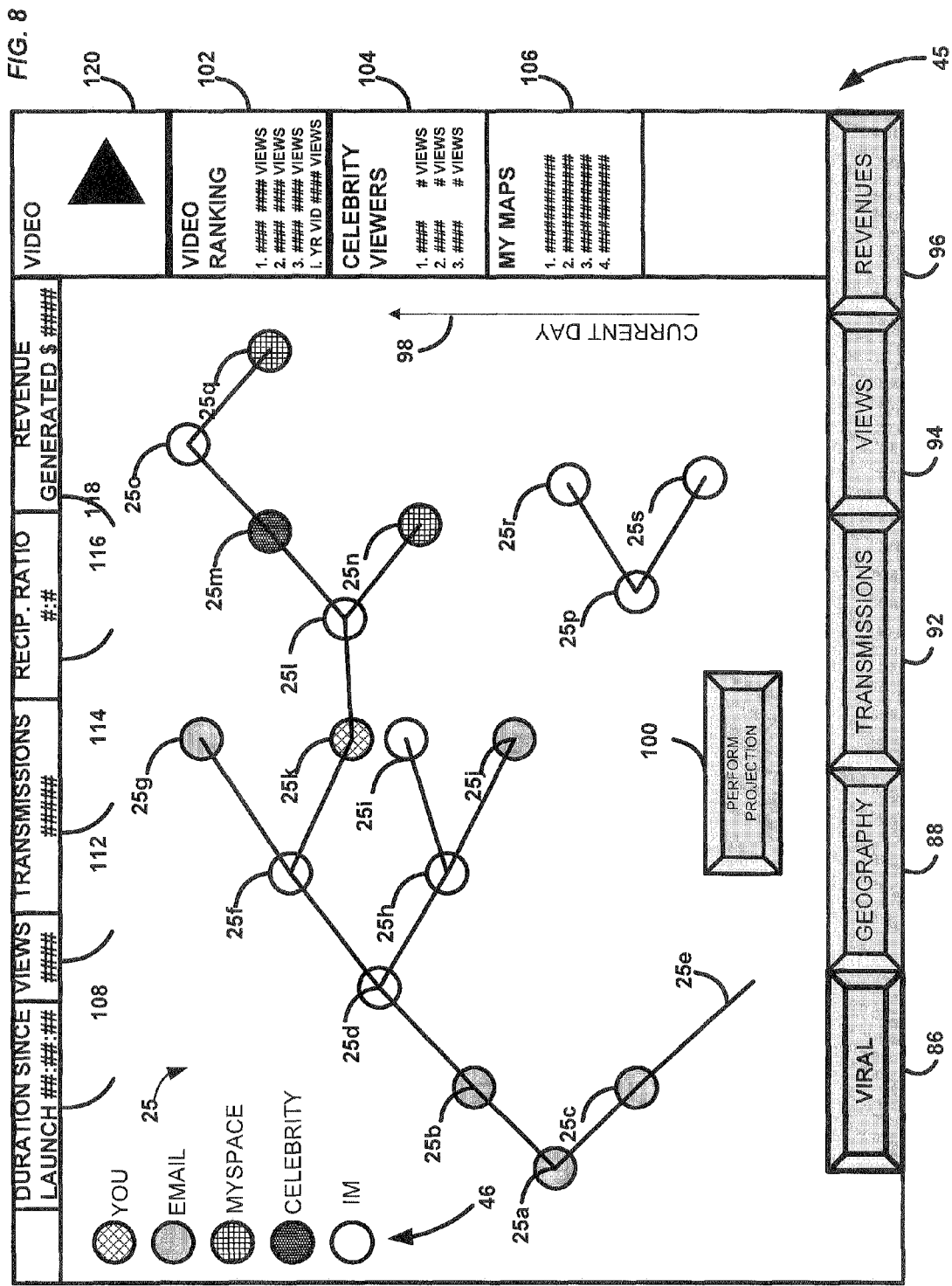
FIG. 8 is an exemplary user interface showing a node tree.

FIG. 8 shows a user interface 45 displaying a node tree 25. As in FIG. 5, a legend 46 is provided to guide the viewer as to the meaning of variously-formatted nodes 25a-25s. Most of the nodes have progressed from the "patient zero" node 25a. However, node 25p and children nodes 25r and 25s are seen to be "orphan" nodes, from which there is no data about their genesis. Such nodes may be considered new "patient zero"

nodes, and may arise from insufficient or missing tracking data between nodes, or via a user discovering a content item for which they have received no forwarding information. An appropriate indication may also be provided for nodes in which the playback status is unknown. In any case, such orphan nodes may also be identified and tracked by the system and method described here. It is further noted that, in many instances, such orphan nodes may comprise the majority of nodes present. That is, prior to an exponential growth in the number of forwardings, as often occurs, initial propagation may be by users discovering a media item on their own or via other means for which forwarding and receiving data are insufficient. Consequently, it may be often the case that such orphan nodes will be numerous at early stages of a viral propagation, and as the lifespan of the propagation progresses, there will appear progressively more children nodes, grandchildren nodes, and so on.

It is further noted that in many cases a bimodal distribution will occur, catalysed by an orphan node. For example, a viral propagation may be described by a normal distribution. After a while, a new user discovers a media item (causing display of an orphan node), and the propagation begins all over again.

A number of buttons 86, 88, 92, 94, and 96, are provided to allow the user to switch the display between the various views. Button 86 displays the viral (node tree) view, button 88 displays the map view, button 92 displays graphs related to the number of transmissions of the content item, button 94 displays graphs related to the number of views of the content item, and button 96 displays graphs related to the revenue gained from forwards of the content item. Of course, the views described here are exemplary and more or less may be provided according to the desires of the user.

In FIG. 8, button 86 has been selected and a viral node tree 25 is displayed. An x-axis is not displayed but may be understood as corresponding to time. Accordingly, a marker 98 is displayed as to the current time, and the same may be movable to various locations. However, no identification with respect to time is necessary. That is, the nodes may be spaced along the x-axis in a way proportional to the time between the occurrences that gave rise to the nodes, or the nodes may be spaced with a constant spacing. In any case, hovering a cursor over any given node may display additional details about the node.

The top border of the interface 45 displays additional details about the propagation of the content item, including a field 108 displaying duration since launch, a field 112 displaying the number of views, a field 114 displaying the number of transmissions, a field 116 showing a ration of the average number of forwardings per recipient, and a field 118 showing the revenue generated since launch.

The right border of the interface 45 displays additional details about the content item, and may include a field 120 where the content item may be played. A field 102 may be employed to show the ranking of the content item in terms of number of transmissions or playbacks (viewings). A field 104 may display any celebrity viewings of the content item. A field 106 may display a list of content items for which the user is monitoring the propagation.

A button 100 may be provided which when clicked or selected displays a projection of the propagation of the current content item a certain amount of time (which may be chosen by the user) into the future. The basis for the projection may be historical antecedent data of analogous content items, historical antecedent data as determined by comparison to the current node tree (using, e.g., the percentage of recipients forwarding the content item, the average number forwarded to, etc.), or a mathematical projection using the data obtained up to that point.

As additional viewings occur, the node tree may scroll to the left to allow the new nodes to be seen. The vertical axis may compress if necessary to accommodate any wider distribution in that direction.

Figure 9:
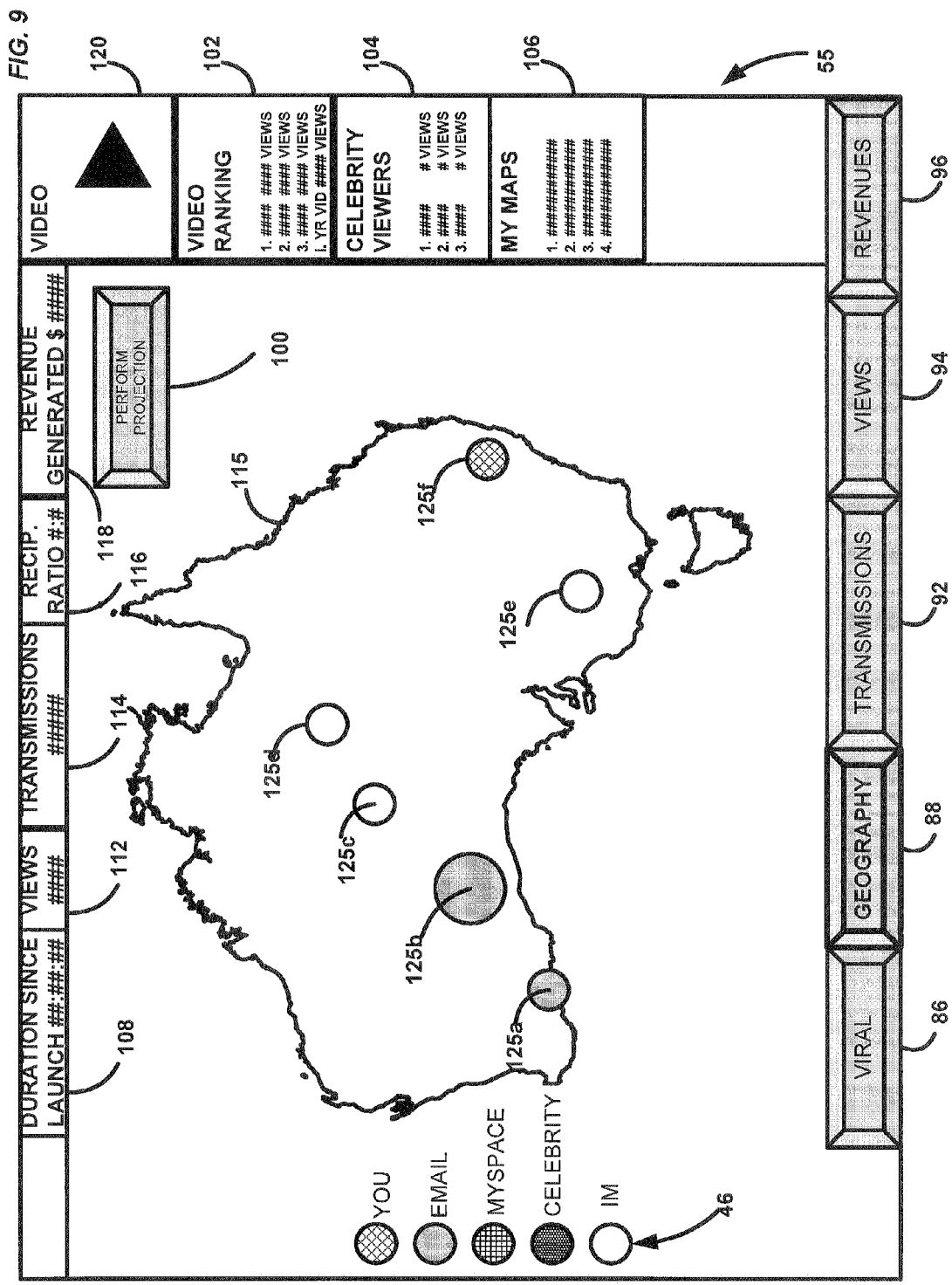
FIG. 9 is an exemplary user interface showing a map view with nodes.

FIG. 9 shows a map or geographic node view 55. Upon selection of button 88, a map 115 is displayed, with nodes representing the geographic locations of consumers and transmitters of the content item. The map 115 is displayed as a country map, but world maps may often be employed for the same purpose, as well as maps of any other desired scale. Maps of a particular scale may be contextually created "on the fly" according to the geographic location and distribution of the forwarders and recipients. A number of nodes 125a-125f are displayed on map 115. In one embodiment, the nodes may increase in size as more users in a given vicinity view a given content item. In another embodiment, a node may pulsate if a user in a given vicinity is currently viewing the given content item.

In some embodiments, arrows may be drawn to indicate a relationship between the forwarder and the recipient. Such arrows may appear for a short time to allow the user to view the same, but then may be removed for clarity, with the effects of the forwardings and viewings being visualized in the manner above.

The remainder of the functionality described in connection with FIG. 8 is generally present in the interface 55. For example, the Perform Projection button 100 may cause nodes to appear and/or grow according to how analogous content items have propagated through the given geographic extent.

Figure 10:
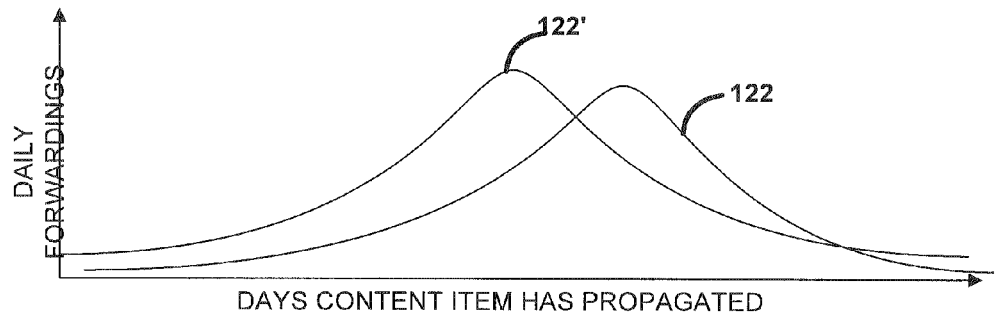
FIGS. 10-12 are exemplary graphs which may be shown in a user interface, the graphs indicating parameters displayed on a per-time-period basis.

Upon clicking or selection of button 92, a graph such as is exemplified in FIG. 10 may be displayed. FIG. 10 shows the number of daily transmissions or forwardings 122 as a function of the number of days the content item has propagated. Of course, the scale of the graph is arbitrary—for some content items, e.g., the x-axis may employ a scale of hours or even minutes rather than days. Moreover, the granularity of the data may be such that the graph is not displayed as a curve but rather in columnar format. FIG. 10 further displays a curve of historical data denoted as the primed counterpart 122' of curve 122. As may be seen in the example of FIG. 10, the propagation of the subject content item, and the historical data, follow approximately normal distributions, and the subject content item has peaked in its normal distribution later in the propagation lifecycle than its historical counterpart.

Figure 11:
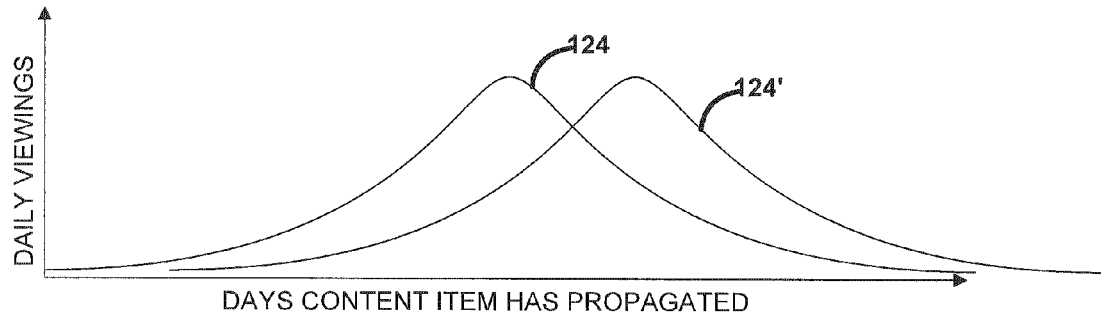

Upon clicking or selection of button 94, a graph such as FIG. 11 may be displayed. FIG. 11 is similar to FIG. 10, but differs in that FIG. 11 instead shows the number of daily viewings or playbacks 124, again on a per-time-period basis. Curve 124' represents the historical data, and in FIG. 11 is seen to lag the subject content item.

Figure 12:
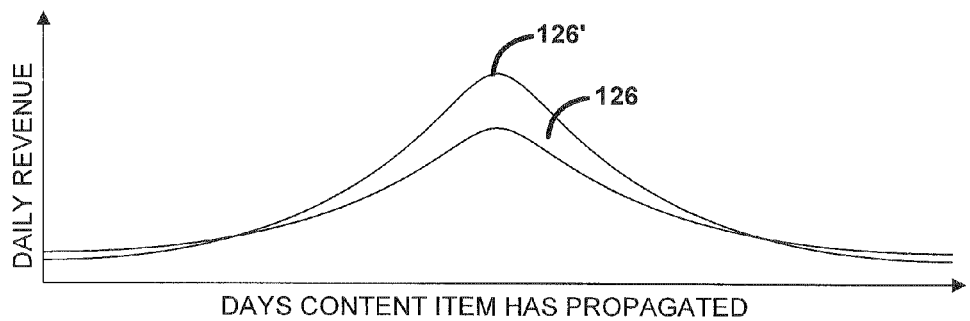

Upon clicking or selection of button 96, a graph such as FIG. 12 may be displayed. FIG. 12 shows the daily revenue 126 generated due to the propagation, again on a per-time-period basis. Curve 126' shows the historical data, which in FIG. 12 is shown to have a revenue curve that is very close to that of the subject content item.

Revenues may be generated or garnered in several ways. In one embodiment, a sweepstakes-type contest may be employed, where users are entered into a sweepstakes for each forward they perform. In other exemplary systems, users who forward the most links for a given subject, e.g., a particular artist, may be rewarded. By rewarding the user, the same may be incentivized to provide additional information about themselves, which can lead to additional accuracy in pinpointing and consequently seeding key influencers. Top forwarders may be entered into a premier tier of users, the same enjoying benefits regular users do not, such as enhanced viewing capabilities of tracked data, tickets to movies, free downloads, and the like.

Figure 13:
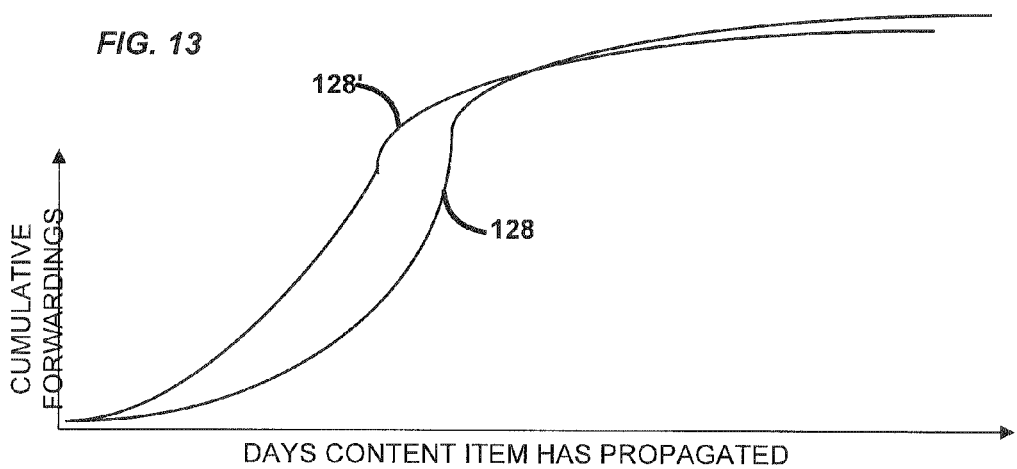
FIGS. 13-15 are exemplary graphs which may be shown in a user interface, the graphs indicating parameters displayed on a cumulative basis.
Figure 14:
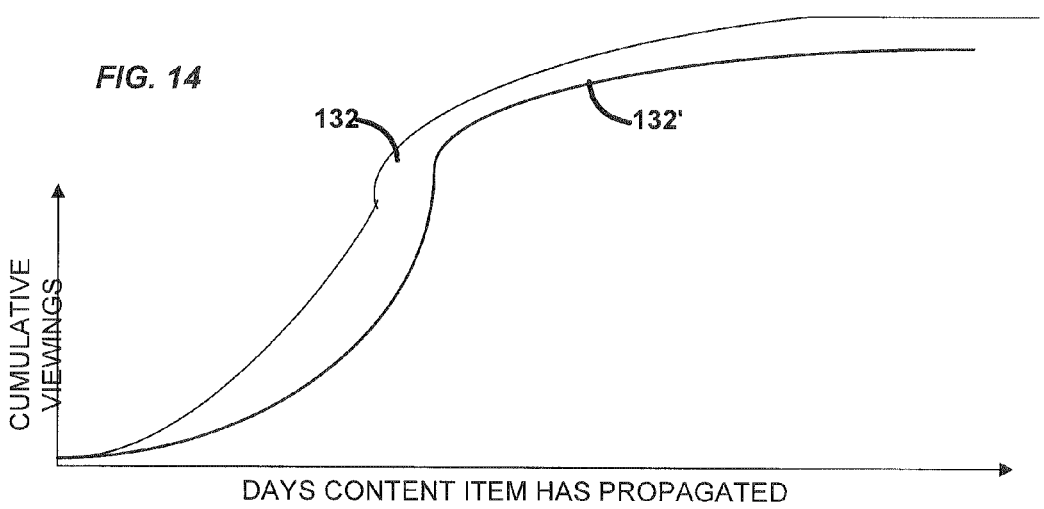

Besides showing curves demonstrating per-time-period parameters, cumulative views, i.e., graphs showing accumulated values of parameters, again as a function of the time the content item has propagated, may also be displayed. The same may be displayed upon clicking or selection of an appropriate option (not shown) on the corresponding per-time-period view. FIG. 13 shows a curve 128 of the cumulative number of forwardings, along with a historical curve 128'. Similarly, FIG. 14 shows a curve 132 of the cumulative number of viewings, along with a historical curve 132'. And FIG. 15 shows a curve 134 of the cumulative amount of revenue, along with a historical curve 134'.

Besides node trees, maps, and graphs, other views may also be displayed of the tracking data. FIG. 16 shows a "tickertape"-like interface 136 in which viewings, forwardings, and postings are sequentially listed as they occur in a scrolling format, allowing the user to review certain details of activity as it occurs.

Figure 15:
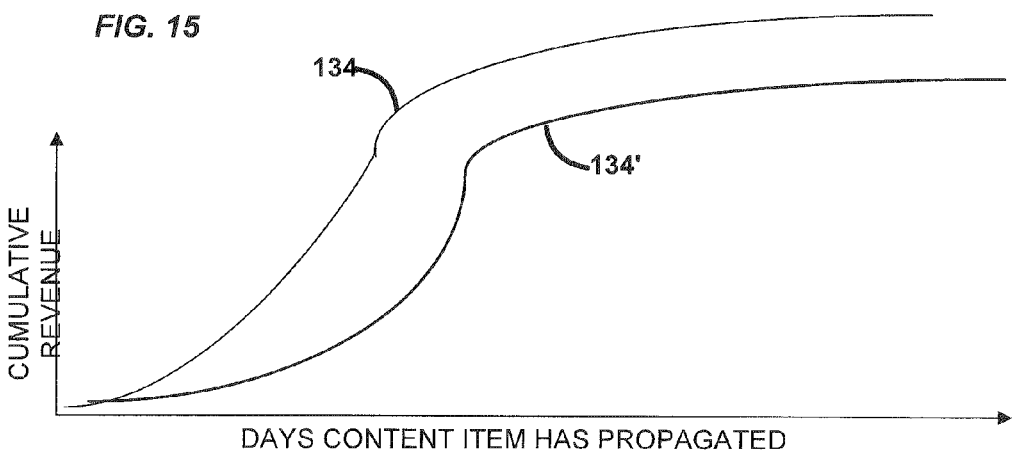

FIG. 17 shows a graph similar to that of FIGS. 13-15. In particular, FIG. 17 is a graph having a parameter curve 138 that may represent any of viewings, postings, revenue, or forwardings, on a cumulative basis. The current point in time, up to which the parameter has been measured, is shown by a marker 142. The future behavior of the curve 138 may be estimated in a number of ways. Selection of button 152 leads to calculation and display of curve 144, which represents a projection based on historical behavior of content items analogous to the subject content item. Similarly, selection of button 154 leads to calculation and display of curve 146, which represents a projection based on a mathematical progression using data in the curve 138. For example, curve 146 may be based on linear or multiple regression, curve fitting, least-squares analysis, or any other method of estimating future data or curve behavior based on prior data. In an embodiment noted above, curve 146 may be based on percentage of times a recipient forwards a content item and the average number of recipients for a forwarding of a content item.

A summary window 148 may also be displayed, the summary window showing a calculated or projected total number of views, an expected end date (after which the content item activity is projected to fall below the predetermined threshold), as well as the revenue expected to be generated.

It is noted that in any display of tracked data, any total values, either cumulative or on a per-time-period basis, may be specified to be either the total for all activity related to the content item or may be specified to be relative to a portion of the activity caused by a particular user's actions, such as via playing back or forwarding.

Additional potential views are now described.

Figure 18:
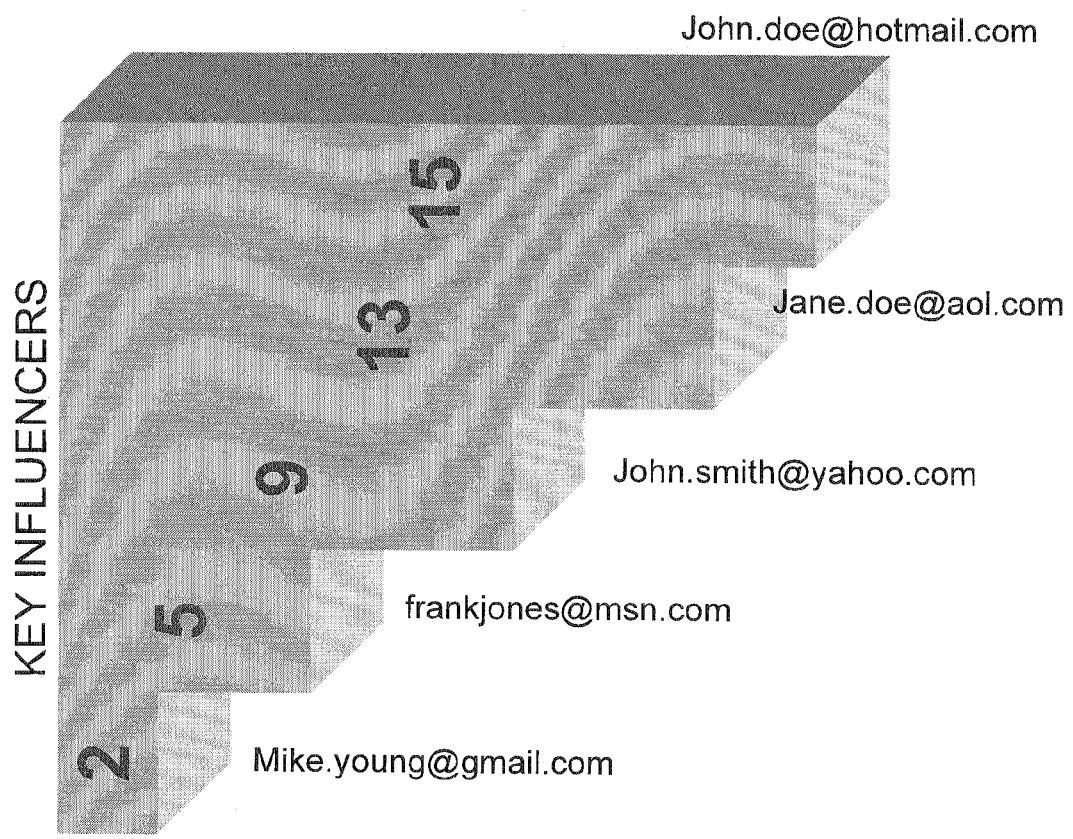
FIG. 18 shows an exemplary columnar list of key influencers.

FIG. 18 shows a columnar view that may be accessible in certain implementations, especially for content generators and implementers of marketing campaigns using the tracking method. FIG. 18 shows total numbers of forwards attributable to given users, identified by email address. As noted above, the determination of key influencers may be as simple as displayed in FIG. 18 or may employ considerable sophistication, as dictated by the requirements of the user.

FIG. 19 shows a "league table" in which the viewings (alternatively, transmissions) of exemplary videos 1 through 4 are displayed broken up by country of viewing, e.g., Japan, the USA, and Canada. Total viewings are also displayed. Using a league table representation like this, users may keep track and/or keep score of the popularity of a content item as compared to other circulating content items.

According to embodiments of the present invention, as fully described above, systems and methods are provided for tracking propagation of virally-spread content items, such as are employed in certain types of marketing campaigns. By analysis of the tracking data, the propagation can be optimized and the effectiveness of such efforts enhanced.

Figure 20:
FIG. 20 shows an exemplary search form.

Additional variations and implementations are also possible. For example, the system may be logged onto by a user and then queried about past and present tracking efforts. Referring to FIGS. 20 and 21, a search form and subsequent results are shown. In FIG. 20, a user may be presented with various options for searching for a particular type of content item and may further specify details about prior tracked viral propagations. FIG. 21 displays results, which may include a number of fields or columns, such as the title of the content item, when it was launched, the type of content item, number of transmissions, number of viewings, and so on. The results may also listed a virality rating, which is generally a measure of the extent to which a content item will spread from one user to another. One way of quantifying virality may be the percentage of nodes that are orphans relative to the overall number of nodes; other ways may also be employed.

As another application of the system and method, if a user has a content item that is desired to be marketed by viral propagation, a query may be made as to who were the key influencers of analogous content items. For a fee, generally, the identities of such influencers may be obtained and the same may be seeded with emails or IM about the content item to enhance the likelihood the content item will spread to a large number of viewers.

In another variation, combinations of the views described may be displayed in a split-screen fashion. The views may be cycled through as part of a screensaver, allowing the user to view multiple views with little or no effort required. The screensaver may only cycle through active content item propagations, and may skip over inactive ones.

The system may be licensed via a tracking API that other sites can use to embed trackable links. A tracking site may host reporting pages, or may license the code to others to host reporting pages. The system may be implemented as a turn-key hosted service with a web-based administrative console.

Viewers may rate the content item, and the rating may be displayed along with the content item, or when the content item is played back.

The content items can be any type of digital data files—audio, video, text, data, applications including viral internet games as well as other types of applications, and so on. The network transfer of shared files or links between users can be encrypted or clear. While the systems and methods have been disclosed in the context of online websites for media content, the same may also be employed on a single computer or LAN or WLAN in order to track propagation of any items of content stored locally, or indeed to track propagation of any items of content for which access may be gained. Playback software can be stored on a server but downloaded automatically to users' systems for execution. The media content site can support multiple levels of access for a content item file, for example, a preview version of a file can be made available.

While the term "computer" has been used, this term is intended to encompass any computing machine, including desktop computers, laptop computers, handheld computers, tablet computers, smart phones, personal digital assistants, and any other device to or from which data may be transferred. Various other examples could also be formulated given this teaching.

While the invention has been described with respect to certain embodiments, it should be clear to one of ordinary skill in the art, given this teaching, that the invention is much broader than the embodiments shown.

Accordingly, the description represents some, but not all, representations, and therefore the scope of this invention is to be limited only by the claims appended to this description.

The invention claimed is:

1. A method of tracking and displaying viral propagation of a content item over a network, comprising:
   a. obtaining a set of information about a first recipient and a second recipient of a content item, wherein the first recipient has forwarded information about the content item to at least the second recipient, wherein the set of information includes information about whether the second recipient has played the content item;
   b. storing the set of information; and
   c. displaying a first node indicating the first recipient and at least a second node indicating the second recipient.

2. The method of claim 1, wherein the displaying includes displaying a node tree.

3. The method of claim 2, wherein the displaying further comprises displaying a current date or time marker and displaying a projected node tree for times subsequent to the current date or time marker, the projection based on a mathematical projection or based on a viral propagation of an analogous content item.

4. The method of claim 3, wherein the content item and the analogous content item share a characteristic in common, the characteristic being a variable stored as metadata.

5. The method of claim 1, wherein the displaying includes displaying information about the first recipient and information about the second recipient in a list.

6. The method of claim 1, wherein the displaying includes displaying a geographic map with nodes disposed thereon, the nodes indicating the geographic location of the first and second recipients.

7. The method of claim 6, wherein the displaying further comprises displaying a progression of growth of the map in a time-lapse manner.

8. The method of claim 1, wherein the obtaining includes receiving information from a web form or from an executable mobile application form run on a mobile phone.

9. The method of claim 8, wherein the obtaining includes receiving information from a media content website.

10. The method of claim 9, wherein the forwarded information about the content item is a link to the media content website.

11. The method of claim 1, further comprising identifying and storing information about one or more key influencers.

12. The method of claim 11, wherein the identifying includes determining which recipients, in combination with their subsequent child recipients, have forwarded the content item on to a highest number of other recipients.

13. The method of claim 2, wherein the displaying further comprises displaying a progression of growth of the node tree in a time-lapse manner.

14. The method of claim 1, further comprising:
   a. obtaining a set of information about a recipient of a content item, wherein the set of information includes information about whether the recipient has played the content item;
   b. storing the set of information; and
   c. displaying a node indicating the recipient.

15. A method of tracking and displaying viral propagation of a content item over a network, comprising:
   a. obtaining a set of information about a first recipient and a second recipient of a content item, wherein the first recipient has forwarded information about the content item to at least the second recipient, and wherein the set of information includes information about whether the second recipient has played the content item;
   b. storing the set of information;
   c. displaying a first node indicating the first recipient and at least a second node indicating the second recipient, wherein the displaying includes displaying a node tree; and
   d. wherein the displaying further comprises displaying a geographic map with nodes disposed thereon, the nodes indicating the geographic location of the first and second recipients, and wherein the displaying a node tree and the displaying a map are performed sequentially as part of a screensaver.

16. A method of tracking and displaying viral propagation of a content item over a network, comprising:
   a. obtaining information about at least one forwarder of a content item, at least one recipient of the content item, the number of times the content item has been forwarded, and the number of times the content item has been played;
   b. storing the obtained information; and
   c. displaying a graph with time as the x-axis and a parameter, directly proportional to either the number of times the content item has been forwarded or the number of times the content item has been played, on the y-axis.

17. The method of claim 16, wherein the displaying further comprises displaying a current date or time marker and displaying a projected graph for times subsequent to the current date or time marker, the projection based on a mathematical projection or based on parameters of a prior viral propagation of an analogous content item.

18. The method of claim 17, wherein the content item and the analogous content item share a characteristic in common, the characteristic being a variable stored as metadata.

19. The method of claim 16, wherein the parameter is displayed on a per-time-period basis.

20. The method of claim 16, wherein the parameter is displayed on a cumulative basis.

21. A method of tracking and displaying viral propagation of a content item over a network, comprising:
   a. obtaining information about at least one forwarder of a content item, at least one recipient of the content item, the number of times the content item has been forwarded, and the number of times the content item has been played;
   b. storing the obtained information;
   c. displaying a graph with time as the x-axis and a parameter, directly proportional to either the number of times the content item has been forwarded or the number of times the content item has been played, on the y-axis; and
   d. selecting a parameter from the group consisting of: the number of times the content item has been forwarded, the number of times the content item has been played, and a revenue generated by a forwarder forwarding a content item.

22. A user interface for tracking and displaying viral propagation of a content item over a network, comprising:
   e. a node component including:
      i. a node tree button which when selected displays a node tree including a first node indicating a first recipient and a second node indicating a second recipient, wherein the first recipient has forwarded information about a content item to at least the second recipient; or
ii. a map button which when selected displays a map including a first node indicating a geographic location of a first recipient and a second node indicating a geographic location of a second recipient, wherein the first recipient has forwarded information about the content item at least to the second recipient; and
f. a graph button which when selected displays a graph with time as the x-axis and a parameter, directly proportional to either the number of times the content item has been forwarded or the number of times the content item has been played, on the y-axis.

* * * * *